United States Patent [19]

Turner et al.

[11] Patent Number: 4,907,079

[45] Date of Patent: Mar. 6, 1990

[54] SYSTEM FOR MONITORING AND CONTROL OF HOME ENTERTAINMENT ELECTRONIC DEVICES

[75] Inventors: Lester Turner, Fountain Valley; Herbert F. Primosch, Irvine, both of Calif.

[73] Assignee: Teleview Rating Corporation, Inc., Woodbury, N.Y.

[21] Appl. No.: 101,750

[22] Filed: Sep. 28, 1987

[51] Int. Cl.[4] ........................ H04H 9/00; H04M 11/00

[52] U.S. Cl. ........................ 358/84; 358/181; 455/2; 379/92; 381/42

[58] Field of Search ........................ 358/84, 181; 455/2; 379/92; 381/42

[56] References Cited

U.S. PATENT DOCUMENTS

| | | | |
|---|---|---|---|
| 4,363,102 | 12/1982 | Holmgren et al. | 381/42 X |
| 4,488,179 | 12/1984 | Kruger et al. | 358/181 |
| 4,546,382 | 10/1985 | McKenna et al. | 358/84 |
| 4,581,484 | 4/1986 | Bendig | 379/96 X |
| 4,581,645 | 4/1986 | Beyers, Jr. | 358/181 |
| 4,622,583 | 11/1986 | Watanabe et al. | 358/84 |
| 4,644,509 | 2/1987 | Kiewit et al. | 358/84 |
| 4,658,290 | 4/1987 | McKenna et al. | 358/84 |
| 4,712,242 | 12/1987 | Ratjasekaran et al. | 381/42 |
| 4,720,863 | 1/1988 | Li et al. | 381/42 |
| 4,779,198 | 10/1988 | Lurie | 358/84 |
| 4,808,992 | 2/1989 | Beyers, Jr. et al. | 358/181 X |
| 4,816,904 | 3/1989 | McKenna et al. | 358/84 |

*Primary Examiner*—Keith E. George

*Attorney, Agent, or Firm*—Beehler & Pavitt

[57] ABSTRACT

The invention networks a conventional and unmodified television receiver, television monitor, stereo amplifier, VCR's, video disc player, etc. and communicates via telephone lines with any remote central computer. The viewer provides channel selection commands or other programming commands to a microprocessor through an infrared channel selection unit. A motion detector detects entry or exit of viewers from the viewing location to monitor viewing behavior during a program. The microprocessor interactively communicates with the viewer through speech input and output modules and alphanumeric displays which are combined with the video signal and displayed on the television or monitor screen. A VCR tuner and TV tuner within the system provide audio and video signals for the conventional television monitor or television receiver. An AM and FM radio tuner may also be included. Each tuner is tunable by the microprocessor. The video and/or audio signals from each tuner and form the user's own video tape players and disc players are coupled to the input side of an audio switch and a video switch. The switches are microprocessor controlled so that the audio and video program from any source may be coupled to any output or display device at the viewing location. The system allows networking of audiovisual communication units for programmable control and for communication with a remote computer to monitor use of each audiovisual unit. The system also allows interactive user communication.

6 Claims, 5 Drawing Sheets

SYSTEM FOR MONITORING AND CONTROL OF HOME ENTERTAINMENT ELECTRONIC DEVICES

BACKGROUND OF THE INVENTION

1. Field of the Invention

The invention relates to the field of monitoring and control of audiovisual communications equipment and in particular to a system for determining the electronic media viewing and listening by an user. For example, the invention relates generally to a two-way digital data communication system which performs audience viewing and listening determination from electronic media such as cable and broadcast television, AM and FM, video magnetic tape and optical video disk.

2. Description of the Prior Art

Television and radio audience monitoring or rating has for the most part been accomplished by using viewer or listener written diaries in which the selected television channel or radio station, program name and corresponding times are manually entered by the cooperating viewers or listeners. The manual diary method is subject to errors which are usually due to the entry of incorrect information or the failure of entry altogether. Furthermore, manual entry provides output information longer after the program has been transmitted, which information can be compiled and analyzed only at great expense and effort. Furthermore, manual logs typically ignore the use of video magnetic tapes or optical video disks recording or play back as part of the viewer behavior.

The prior art has developed some limited audience determination systems. In the most common of these prior art systems, an electronic diary is kept where the user enters an identification number, and a channel or a station number via a keyboard. These data is transmitted over telephone lines to a central computer. Such a system is illustrated, for example, in CHEUNG, "Television Audience Measuring System", U.S. Pat. No. 4,258,386 (1981). This method is similarly error prone because the viewer has to remember and correctly enter an identification number. Furthermore, the system does not track the number of people entering or leaving the viewer area, ignores the operation of video magnetic tape or optical disk recording or play back, provides analyzed information only long after the programs are transmitted, and has only a one way data transmission link.

Another prior art method is based on a video magnetic tape recorder which records exactly what the viewer selects and watches. However, in this method the circuit of the television set must be modified so that the selected channel can be monitored and recorded. Furthermore, this method does not remove the limitations inherent in an electronic diary, namely that the number of people entering or leaving the viewing area is not tracked, operation of video magnetic or optical disk recording or playback is ignored and analyzed information is provided only long after the programs are transmitted. See for example, WATANABE, "Television Audience Measurement System," U.S. Pat. No. 3,803,349 (1974).

A third methodology requires a modification of a television circuit to allow monitoring of the local oscillator radio frequency voltage in the television tuner so that the selected channel can be identified. This voltage is transmitted via telephone lines to a central computer and again has all the limitations of an electronic diary. See CHEUNG, "Television Audience Measuring System," U.S. Pat. No. 4,258,386 (1981).

Other systems have been devised which allow interrogation of a selected group of television sets from a central station, as might for example, be found in a closed circuit system within a hotel. See SULLIVAN, "Interrogated System," U.S. Pat. No. 3878,322 (1975); and SULLIVAN, "Interrogated Transponder System," U.S. Pat. No. 4,079,414 (1978). However, in many of these cases, the transmitted television signal must be especially encoded and the circuitry of the television receivers must incorporate unique logic and transponding circuitry capable of interpreting and responding to the uniquely encoded transmitted television signal.

Similarly, the prior art has devised a system wherein broadcast television may be monitored on a number of specially modified television systems by a select audience in viewing rooms with means for providing an audience reaction to the broadcast program. See for example, FROHBACH, "Television Audience Survey System Providing Feedback Of Accumulative Survey Results To Individual Television Viewer," U.S. Pat. No. 4,107,735 (1978). However, such system again require modification of a television circuit and are not practical for widespread usage in the viewer's own office or residence.

Finally, the prior art has devised a number of systems which can be employed in cable television networks to allow two-way data communication between the viewers and a central station. However, many of these two-way data communication systems do not provide any non-intrusive monitoring of television viewing, but simply use the television as part of an audiovisual receiving station in combination with a keyboard or other input device which allows the viewer to respond to a central station. With the viewer chooses not to respond, there is no way in which the viewing behavior can be monitored. See TABATA, "Line Monitoring Device In Two-Way Data Communication System," U.S. Pat. No. 4,365,259 (1982).

In those cases where programs selection can actually be monitored, the central station is capable of sensing the viewed channel only by being hardwired to the tuning mechanism of the television receiver or to the channel selection keyboard and circuitry. See RICKETTS et al., "Premium Interactive Communication System," U.S. Pat. No. 3,997,718, and MATSUMOTO et al., "Interactive CATV System," U.S. Pat. No. 4,245,245 (1981).

BRIEF SUMMARY OF THE INVENTION

The invention is an electronic system for monitoring and controlling audio and audiovisual communications with a plurality of conventional and unmodified audio and video units. The invention comprises a microprocessor, a digital memory coupled to the microprocessor, and a channel selection circuit for communicating commands to the microprocessor. The channel selection circuit is coupled to the microprocessor. At least one television tuner is provided for receiving an RF television signal and for generating an audio and video output signal. The television tuner is coupled to and tunable by the microprocessor. An audio/video switching circuit is provided for receiving the audio and video signal from the television tuner and for selectively switching the audio and video signal from the television tuner to at least one of the conventional and unmodified units. The audio/video switch circuit is coupled to and controlled by the microprocessor.

As a result, use of the conventional and unmodified audio and video units may be programmably controlled and monitored.

The system when used in combination with a remote source further comprises a communication interface circuit for bidirectionally communicating information between the microprocessor and the remote source. The communication interface circuit communicates with the remote source via telephone lines.

The system further comprises a speech input circuit coupled to the microprocessor. The speech input circuit is provided for receiving audibly generated commands and converting the audible commands into voice signatures. The microprocessor analyses the signatures and compares the corresponding analyzed signatures with a recorded signature stored within the digital memory. The microprocessor generates a correlation factor between the signature provided from the speech input circuit and the recorded signature within the memory. The signature denotes a viewer's/listener's identity.

The system further comprises a motion detection circuit coupled to the microprocessor. The motion detection circuit determines the direction of motion of a viewer/listener in a predefined area across a predefined boundary.

The system further comprises a speech output circuit coupled to the microprocessor. The speech output circuit generates audible output selected according to program control within the microprocessor.

In one embodiment, the system, when used in combination with a conventional and unmodified television receiver and video tape recorder, includes at least two television tuners coupled to the audio/video switch circuit and to the microprocessor. A first one of the two television tuners provides an RF television signal to the conventional and unmodified television receiver via the audio/video switch circuit and an RF modulator. A second one of the television tuners provides the audio and video signal to the conventional and unmodified video tape reorder coupled through the audio/video switch circuit. The second one of the television tuners also is coupled through the audio/video switch circuit and RF modulator to the conventional and unmodified television receiver.

The system, when used in combination with a conventional and unmodified audio amplifier, further comprises at least one radio tuner coupled to the microprocessor and tunable by the microprocessor. The radio tuner generates audio signals appropriate for coupling to the conventional and unmodified audio amplifier.

The system further comprises a character generation circuit coupled to the microprocessor. The character generation circuit generates an alphanumeric information signal in response to information provided from the microprocessor and combines the alphanumeric information signal with a video signal from the audio/video switching circuit. The video signal containing the alphanumeric information is routed via the audio/video switching circuit to the selected conventional and unmodified television receiver and/or monitor.

The system, when used in combination with an external source of video signals, further comprises a VCR signal detector circuit having an input coupled to the audio/video switching circuit and an output coupled to the microprocessor. The VCR detector circuit detects when a video signal is being generated by a VCR when recording or playing back video magnetic tape. This video signal may be from a VCR or a television tuner within the system or coupled from the external source to the system for transmission to the conventional and unmodified television receiver and/or monitor.

The invention is also characterized as an electronic system for monitoring and controlling bidirectional communication of audio and audiovisual information between a remote source and users at a viewing/listening location comprising a microprocessor, a digital memory coupled to the microprocessor, and a channel selection circuit coupled to the microprocessor for communicating programming information to the microprocessor from users at the viewing/listening location. A television tuner is coupled to and tunable by the microprocessor. A VCR tuner is coupled to and tunable by the microprocessor. An audio switching circuit is coupled to and controlled by the microprocessor. The audio switching circuit is also coupled to the television and VCR tuner. A video switching is coupled to and controlled by the microprocessor. The video switching circuit is also coupled to the television and VCR tuner. A character generation circuit is coupled to and controlled by the microprocessor. The character generation circuit generates an alphanumeric signal as provided from the microprocessor and combines the alphanumeric signal into a video signal for display. A plurality of conventional and unmodified audio and video units generate audio outputs and video displays respectively. The plurality of units are selectively coupled through the audio switch circuit and video switch circuit subject to microprocessor control to the television tuner and VCR tuner. The television tuner and VCR tuner are activated and tuned in response to commands provided to the microprocessor through the channel selection circuit. Interactive communiction is provided between the microprocessor and the users at the listening/viewing location through the character generator and speech synthesis circuits and at least one of the plurality of audio and video units as selectively switched through the audio switch circuit and video switch circuit as appropriate.

As a result, the plurality of audio and video units at the viewing/listening location are networked without any requirement of unique design in the units or modification of the units.

The system further comprises a communication interface circuit coupled to the microprocessor for communicating with the remote source via telephone lines. The microprocessor communicates at least near real time information with respect to utilization of the plurality of audio and video units at the viewing/listening location to the remote source through the communication interface circuit.

The system further comprises a radio tuner coupled to and tunable by the microprocessor. The radio tuner generates an audio signal. The audio signal is coupled through the audio switch circuit to at least one of the plurality of audio units for audible reproduction within the viewing/listening location.

The invention is still characterized as a method for monitoring and controlling communications between a remote source and a viewer/listener at a viewing/listening location comprising the steps of communicating commands from a viewer/listener in the viewing/listening location to a microprocessor; tuning at least one television tuner by the microprocessor in response to the commands communicated from the user; displaying a television signal on an unmodified and conventional television receiver as selected by the microprocessor tuned television tuner and bidirectionally communicating operational status of the television tuner to the remote source to monitor use of the conventional television receiver.

The method further comprises the steps of tuning a VCR tuner by the microprocessor in response to commands received by the microprocessor from the user; switching audio and video signals communicated from the VCR tuner and television tuner and a plurality of audio and video units located at the viewing/listening area to an audio switch and video switch for selective display and output among a plurality of audio and video output units at the viewing/listening location; and generating a alphanumeric message for visual display and speech output. The message is communicated from the microprocessor through the audio and video switches to at least one of the audio and video output units at the viewing/listening location.

Turn now to the following diagrams wherein the invention may be better visualized.

Figure 1:
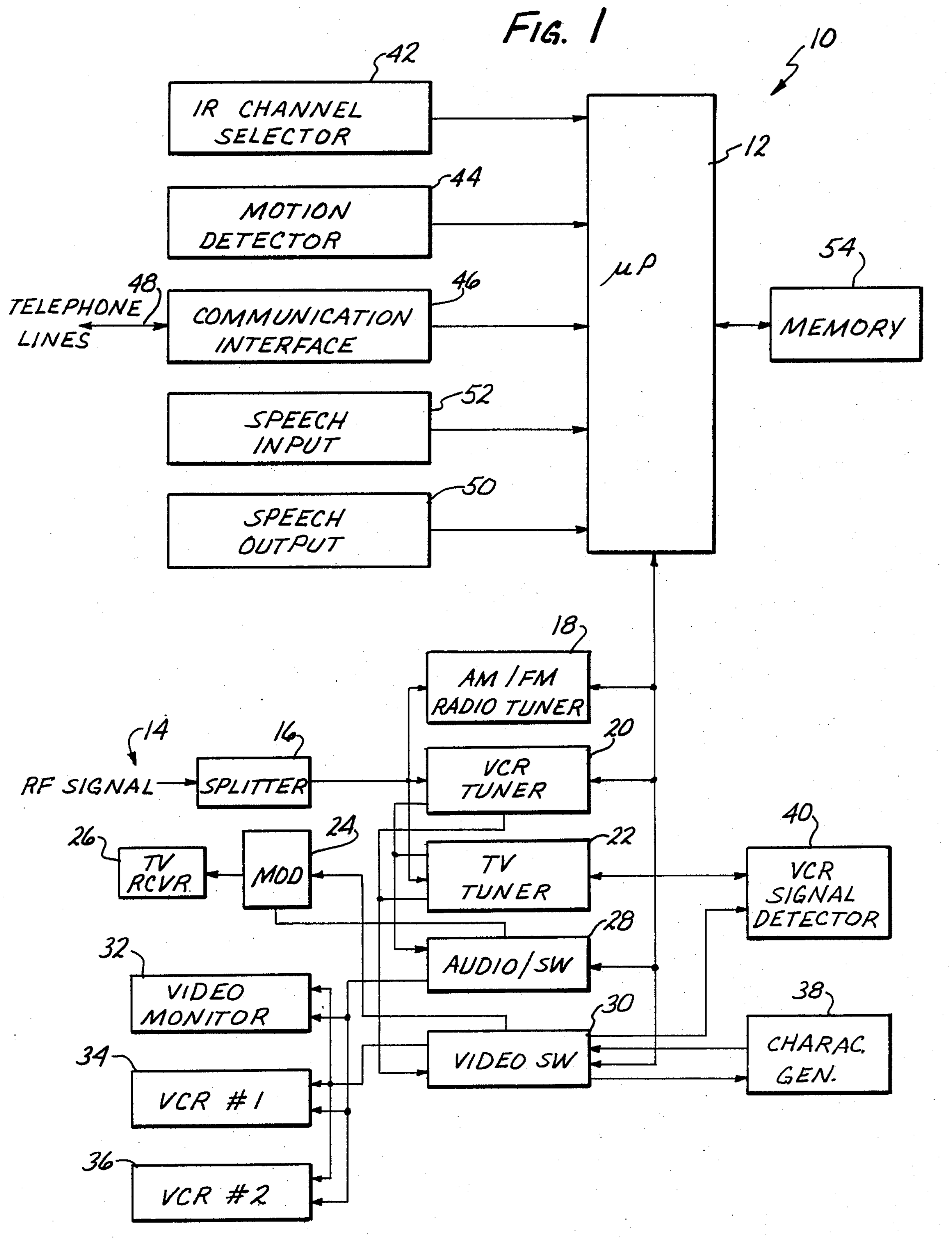
FIG. 1 is an highly diagrammatic block diagram of the overall system according to the invention.

The invention and its various embodiments may now be better understood by turning to the following detailed description.

DETAILED DESCRIPTION OF THE PREFERRED EMBODIMENTS

A conventional and unmodified television receiver, video monitor, stereo amplifier, video magnetic tape recorders and/or players (VCR), video disc player and the like present at a viewer's or listener's home or office are networked by the system of the invention and further bidirectionally communicated via telephone lines with any remote central source or computer. The viewer/listener provides channel selection commands or other programming commands to a microprocessor through an infrared channel selection unit. A motion detector, to detect entry or exit of the viewer from the viewing location, is also be coupled to the microprocessor in order to monitor viewing behavior during a program. The microprocessor interactively communicates with the viewer or listener through speech input and output modules and through alphanumeric displays which are combined with the video signal and displayed on the television screen or monitor screen. A VCR tuner and TV tuner included within the system provide the audio and video signals for the conventional video magnetic tape recorder and television receiver respectively. In the case of the television receiver, the signal are remodulated. An AM and FM radio tuner may also be included. Each of the tuners are coupled to and tunable by the microprocessor according to conventional software control. The audio and video signals from each of the tuners, as well as from the user's own video tape players and discs players, are coupled to the input side of an audio and video switch. The switch is microprocessor control so that the audio and video program, originated from any source, may be appropriately coupled to any output or display device at the viewing location. The input and output of each of the audio and visual units at the viewing location, being coupled through the audio and video switches which in turn are microprocessor controlled, allows all units available for audio visual communication to be microprocessor networked, subject to programmable control, and bidirectionally communicated with a remote computer which may monitor the use of each audio visual unit as well as allow interactive user communication on a real time basis.

In contrast to prior art systems, the system of the invention obtains all required audience information, including the time, active unit selection, the selected channel or station number, viewer or listener identification, and the number of viewers or listeners, including the number which may be entering or leaving the monitoring area, all automatically without special viewer input and in a nonintrusive manner which neither relies upon special behavior or a reliable memory of the viewer nor interferes with his normal behavior. Furthermore, the system of the invention is capable of automatically determining when a selected program is being recorded on video magnetic tape, when a pre-recorded program on a video magnetic tape or optical disk is being played back and viewed, and when a prerecorded program on video magnetic tape or video optical disk is being duplicated on video magnetic tape.

As will be described in greater detail below, the system is coupled directly to a conventional telephone line and has full two-way communication capability for connection to a remotely located computer. The system is able to transmit information almost immediately after acquisition or may store the information internally. The system also has the ability to almost immediately display received information, instructions and messages on the viewing screens of either a conventional, unmodified television set connected to the system or a conventional, unmodified video monitor. The system is also capable of outputting audible instructions and messages, and receive identification from the viewers from names spoken by the viewers. The system interconnects the viewer's unmodified and conventional television set, video monitor, video magnetic tape recorders, video disk player, and stereo system. Each of these devices may be pre-programmed through use of the system as well and networked with outside sources and computers.

Turn now to the highly diagrammatic depiction of FIG. 1, wherein a block diagram of the entire system is illustrated. System 10 is comprised of a conventional microprocessor 12. Each of the peripheral devices and circuits within FIG. 1 are shown as being functionally connected to microprocessor 12 through a direct line. In fact, many of the devices would be coupled to the conventional address/data bus of microprocessor 12 or, in some cases, directly to chip terminals where appropriate depending on the type of microprocessor chosen.

A standard broadcast or cable television RF signal 14 is coupled to conventional RF signal splitter 16. The FM/AM radio signal is extracted and coupled to an AM, FM tuner 18. The AM RF signal is provided directly to the AM tuner portion of tuner 18 from its own antenna.

The television signal is extracted by splitter 16 and coupled to the input of a VCR tuner 20 and a TV tuner 22. VCR tuner 20 and TV tuner 22 are each provided to allow recording of one program and simultaneous viewing of another. Thus, there are two television tuners in the system of FIG. 1. The first television, TV tuner 22, has its video and audio outputs coupled via a video switch 30 to a modulator 24 and then to a conventional television set 26. The audio and video outputs of the second television tuner, VCR tuner 20, are coupled to a solid state audio switch 28 and solid state video switch 30 respectively. Switches 28 and 30 in turn are coupled to television monitor 32 and to one or two conventional video tape players, VCR 24 and 36, and a video disc player 37.

Microprocessor 12, subject to software control, may selectively insert visual messages into the video signal for screen display output by means of character generator 28, which has its input coupled to the address/data bus of microprocessor 12 and its output coupled to video switch 30.

The type of activity which is performed by either or both VCR's is monitored by a VCR signal detector 40, having its input coupled to video switch 30 and its output coupled to the address/data bus of microprocessor 12.

An infrared channel selector 42 is used by the viewer or listener to send appropriate commands to microprocessor 12 to select among the possible devices which the viewer or listener can utilize as well as to select the program or enter other types of programming modes.

Whether a viewer has entered or left the viewing area is detected by motion detector 44 and communicated to microprocessor 12.

A two-way standard switched telephone line is coupled through a full duplex automatic dialing and automatic answering data communications interface which includes a modem which is connected to telephone lines 48 via a standard direct access arrangement.

In addition to being able to display printed messages generated by character generator 38 on the output screens, microprocessor 12 also generates an audio output through speech output module 50 which may correspond to the visual output, may supplement it, or be used alone. The listener or viewer is identified through a speech input module 52 which is able to identify the signature of the speaker's voice for providing a nonintrusive log-on procedure.

Figure 2:
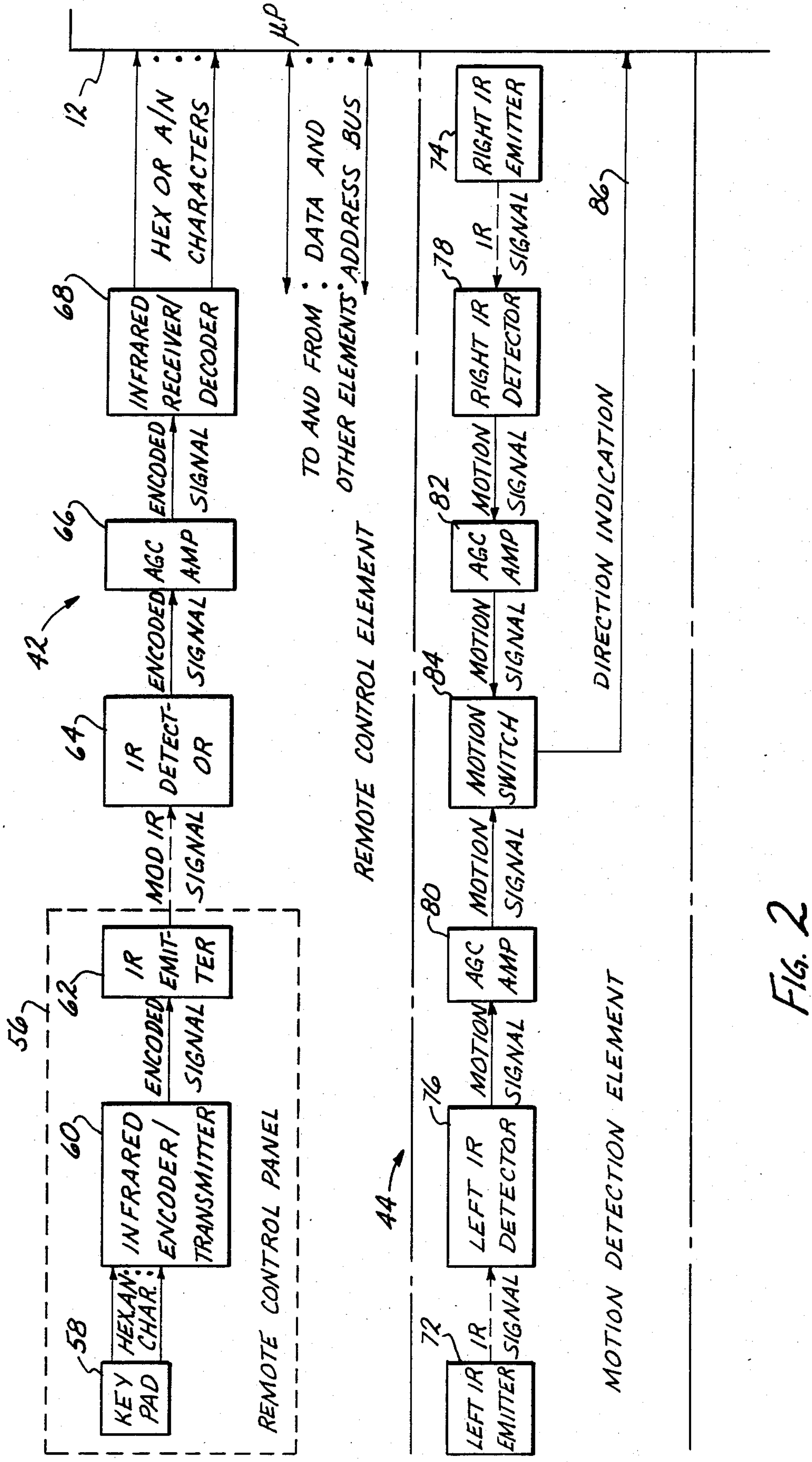
FIG. 2 is a more detailed block diagram of the motion detection element and remote control channel selection element depicted in FIG. 1.

Turn now to FIG. 2, wherein infrared channel selector 42 and motion detector 44 are more explicitly detailed. Infrared channel selector 42 includes a remote control unit denoted by reference numeral 56 which is typically a hand-held unit including a key pad 58. Key pad 58 may include any alphanumeric or special coded keys and transmits either hexadecimal or alphanumeric characters to an infrared coder/transmitter 60. The key stroke, which the user enters on key pad 58, is encoded by encoder 60 and an encoded signal is then transmitted to an infrared emitter 62. A modulated infrared signal is then broadcast from remote control unit 56 to an infrared detector 64 mounted in a control box which houses the remaining portions of the system as depicted in FIG. 1. The encoded signal is received by infrared detector 64, and coupled to an automatic gain control amplifier 66. The amplified signal is then coupled to an infrared receiver/decoder 68 which reconverts the modulated signal into a digital hexadecimal or alphanumeric character code. The character code is then coupled to the address/data bus of microprocessor 12 together with any appropriate bus control commands.

Figure 3:
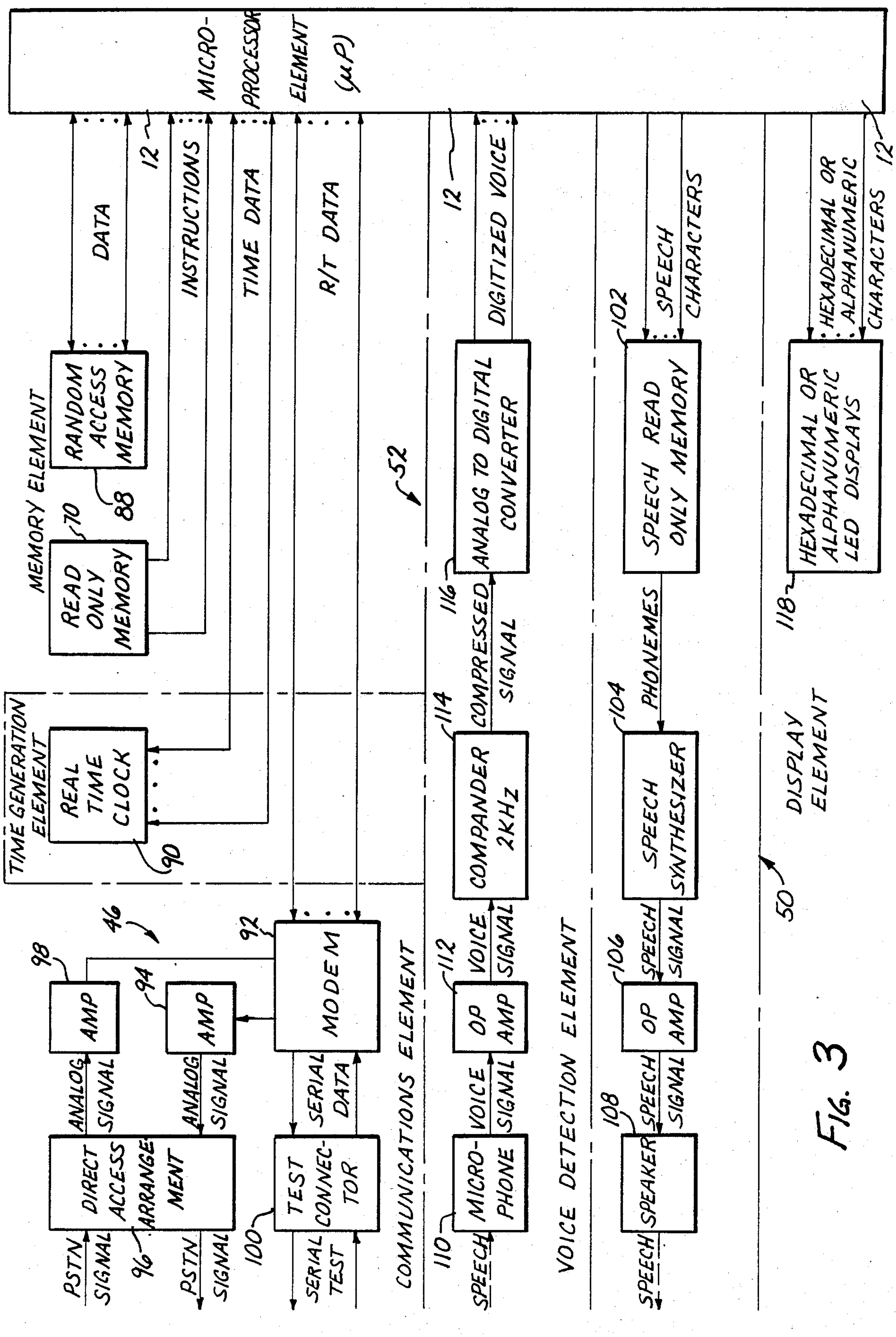
FIG. 3 is a diagrammatic depiction of the communication interface, speech input and speech output elements depicted in FIG. 1.

Therefore, the listener or viewer is able to program the operation of microprocessor 12 and provide input as allowed or requested by such instructions stored within microprocessor 12 or more specifically within read only memory 70 depicted in FIG. 3.

Returning to FIG. 2, motion detector 44 is diagrammatically depicted as comprised of left infrared emitter 72 and right infrared emitter 74 and associated detection circuits. Left infrared emitter 72 and right infrared emitter 74 are coupled respectively through infrared transmission and reflection to a left infrared detector 76 and a right infrared detector 78. Typically, the emitter, which is in the system housing, transmits an infrared signal across the viewing area to a focused reflector. The infrared signal is then reflected back from the focused reflector to the corresponding infrared detectors 76 or 78 also housed within the control unit housing. Typically, infrared emitters 72 and 74 are approximately one foot apart and thus provide a parallel set of closely spaced beams that will be transmitted across the viewing area and back so that if any person enters the viewing area or leaves the viewing area, a sequenced infrared signal is either received first in infrared detector 76 and then infrared detector 78 or vice versa. The order in which the signal are received in detectors 76 and 78 then indicates whether a viewer has moved from left to right or right to left. The significance of the direction of movement is encoded into the memory associated with microprocessor 12 at the time of installation of system to either signify a person entering or leaving the area as appropriate. In the case where two or more access points are provided to the viewers or listeners of the monitoring equipment, additional motion detectors 44 may be installed at each access location to the viewing area.

In any case, the detected signals from infrared detectors 76 and 78 are then coupled respectively to AGC amplifiers 80 and 82. Timing of the signals received from amplifiers 80 and 82 is detected by a switch 84 which then provides a left-to-right or right-to-left signal indication communicated along line 86 to the address-/data bus of microprocessor 12.

Turn now to FIG. 3, wherein communication interface 46, speech output 50 and speech input 52 elements of FIG. 1 are described in greater detail. FIG. 3 also illustrates a conventional read only memory 70 coupled to the address/data bus of microprocessor 12 in which the instructions for controlling microprocessor 12 is stored. As described below, additional instructions may be downloaded from a remote central processor into microprocessor 12 if desired.

A random access memory 88 is also coupled to the address data bus of microprocessor 12 and provides memory capacity for the speech and character generation operations of microprocessor 12 as well as any downloaded information or stored accumulated information with respect to the operation of the system 10 of FIG. 1.

Finally, a real time clock 90 is also coupled to microprocessor 12 to provide time of day and calendar date as requested by microprocessor control for accurate logging of acquired information. Real time clock 90 may be set or corrected through key pad 58.

Communication interface 46 includes a conventional modem 92 which includes auto dialing, auto answering, full duplex, variable data rate communications. Modem 92, in the illustrated embodiment, is coupled to the microprocessor 12. Digital data received from microprocessor 12 is converted by modem 92 according to conventional methodologies into analog signals provided as output data or amplifier 94. The serial analog data is then converted through a direct access arrangement module (DAA) 96 into conventional PSTN telephone signal format. Therefore, any information within system 10 can be communicated through modem 12, amplifier 94 and DAA 96 across conventional telephone lines to an outside receiving unit or computer. Similarly, information, commands or messages originating from a remote outside computer may be sent on the bidirectional telephone line into DAA 96 which is then converted into analog serial data coupled to the input of amplifier 98. The output of amplifier 98 in turn is coupled to modem 92. Modem 92 again converts the analog serial data into parallel digital format for communication to microprocessor 12.

In addition to providing bi-directional data communication via telephone lines, the digital information input to modem 92 may also be coupled, still in digital format, to a test connector 100. The digital data, now in EIA RS232 serial data format from modem 92, is available at the user's site as a bidirectional data port allowing necessary initialization when system 10 is first installed, as well as providing the possibility for interconnection with other peripherals, including user keyboards, personal computers, digital printers and the like. It should understood, however, that key pad 58 may in fact be a full keyboard if desired.

Therefore, it can be appreciated that information originating from an remote source may be communicated to system 10 along the telephone lines through modem 22 and stored within RAM 88 via microprocessor 12. The downloaded information may then later be displayed on a selected television set or monitor to the viewer or translated into an audio output for the viewer and the listener.

Speech output unit 50 is depicted in greater detail in FIG. 3. Digital data, symbolic of speech characters, is communicated from microprocessor 12 on its address-/data bus to a speech read-only memory 102. Phonemes are then generated or read from memory 102 in a conventional manner and input to a speech synthesizer 104. The speech synthesizer 104 combines the phonemes from read-only memory 102 into an acceptable speech pattern and generates a speech signal which is supplied to an amplifier 106. The output of amplifier 106 in turn is coupled to an audio speaker 108 which provides the audible speech output. It is particularly advantageous in the case of AM or FM radio listener that identification is provided through speech memory 102, synthesizer 104, amplifier 106 and speaker 108, since these listeners are not normally directed to the visual display of the television screen or monitor screen.

Furthermore, visible characters, which are generated on the screen as described below, are reinforced by simultaneously generating their speech equivalent through speech output unit 50. Even for the television viewer, this allows for a more user friendly environment and tends to encourage the viewer to audibly respond to system 10 for the purposes of viewer identification.

Speech input unit 52 in FIG. 1, and as depicted in greater detail in FIG. 3, provides the means for audible viewer identification. Audible speech from the viewer and listener is detected by a microphone 110 which provides a voice signal as output to the input of an amplifier 112. The amplified voice signal from the output of amplifier 112 is input to a compander 114 which compresses the bandwidth of the audio voice signal into an approximately two kilohertz range. As described below, microprocessor 12 does not perform word recognition, but rather performs a power density spectrum analysis on the audio signal to identify the voice signature of the viewer or listener. To assist in reliability of identification, the viewer/listener will audibly input his first and last name. The compressed signal from compander 114 is then coupled to analog-to-digital converter 116. The digitized compressed audio spectrum is then coupled to the address/data bus of microprocessor 12 for processing and identification.

During normal operation, when system 10 is turn on by the user, an initial display message is placed on viewing screen which requests the viewers in the viewing area to speak their first and last names starting with the person whose has performed the channel selection through remote control unit 56. The audio output of any selected channel or station is automatically muted at this time to minimize the background noise. Analog-to-digital converter 116 is a high speed sampling and conversion unit to eliminate sampling and aliasing conversion errors over the entire audio frequency range. The number of bits in the digitized sample produced by A-to-D converter 116 is sufficient to cover the full dynamic amplitude of range of the audio signal and to minimize the effective digitizing error (one-half of the value of the less significant bit). In practice, 12 bits per sample is suitable. The digitized voice samples are then stored in random access memory 88 prior to processing. Other information may also be simultaneously stored within memory 88 such as the sampling time and date, operating status information pertaining to various active devices within system 10, and the selected channel or station number and time tagged number of viewers or listeners monitoring data.

Normally, there is sufficient time between system data acquisition intervals during routine operation of microprocessor 12 for microprocessor 12 to fully perform voice data processing. If there is insufficiently time between other operating modes within microprocessor 12 to accomplish voice data processing, then the input data is stored within memory 88 until such time becomes available.

Voice data processing is based upon a power density spectrum analysis of the digitized voice data. A suitable and conventional processing algorithm is stored within read-only memory 70 and implemented within microprocessor 12. It is also within the scope of the invention that special purpose integrated circuits may be included within system 10 which would do hardware voice data processing by integrating the area under the voice amplitude verses sample time curve for each word of the digitized audio data. During processing, microprocessor 12 normalizes the digital voice data and removes small amplitude samples in order to eliminate the effects of background noise. During the initialization of system 10, each user which is expected or who is to be monitored, has his voice spectrum analyzed and stored within memory 88 subject to control of an appropriate voice-learning program temporarily stored and implemented within microprocessor 12 through test connector 100. The calibration record is comprised of the identified individuals with their first and last names, the time and date of calibration, and a power density spectrum analysis of the digitized name data.

When an unidentified power density spectrum corresponding to two words of digitized voice data is compared to the calibrated spectrums stored within memory 88, a correlation factor is calculated between the two power density spectrums. The correlation factor may them be similarly stored within memory 88 and transmitted as a measure of the confidence level in the identification of the voice signatures received from the identifying viewer. The voice signature identification implemented within microprocessor 12 is performed here in an largely conventional manner but has been set forth in somewhat detailed outline for the purposes of clarity.

Microprocessor 12 similarly has a hexadecimal or alphanumeric LED display 118 coupled to its address-/database to allow a direct alphanumeric digital display not dependent upon a monitor or television screen. Among other uses, LED display 118 may be used to display the AM or FM radio channel number in such cases where the television or monitor screen may not be active.

FIGS. 2 and 3 describe the user and remote station input and output modules included within system 10. Turn now to the illustration of FIGS. 4 and 5 wherein a diagrammatic block diagram of the means by which the communication signals are controlled and monitored in system 10.

Figure 4:
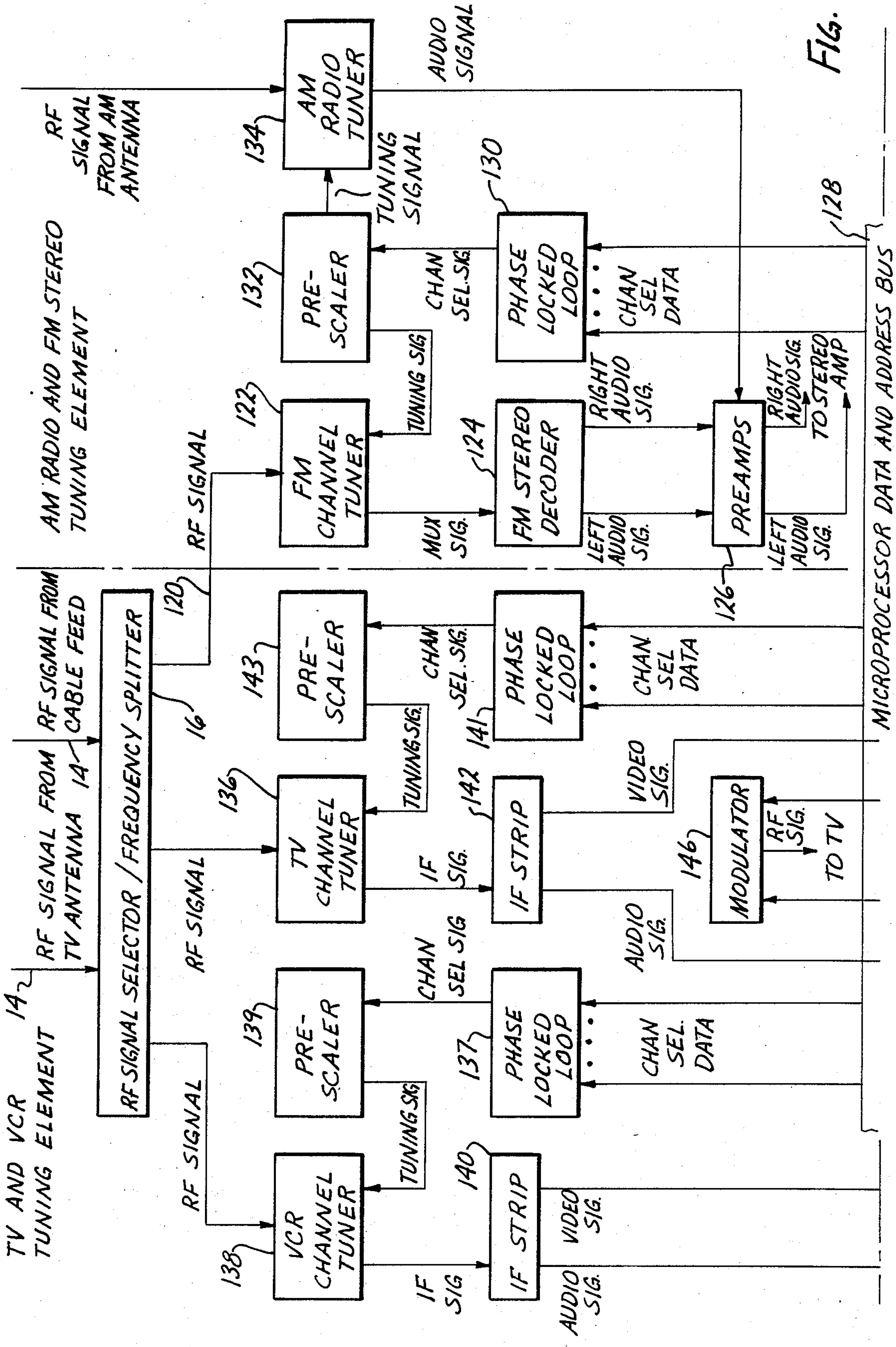
FIG. 4 is diagrammatic depiction of the VCR, television, FM and AM tuning elements depicted in FIG. 1.

In FIG. 4 a RF signal 14 is shown as input to a RF signal selector/frequency splitter 16. As previously described, splitter 16 extracts and directs the FM signal which is coupled via line 20 to a FM channel tuner 122. The multiplexed output signal from FM channel tuner 122 is then coupled to a conventional FM stereo decoder 124. The left and right audio signals are output from stereo decoder 124 to a conventional preamplifier 126. The audio signals may then be coupled to a conventional and unmodified stereo amplifier which the listener would have in his home or office.

FM station selection data is coupled from microprocessor address/data bus 128 to a phase-lock-loop circuit 130. Phase-lock-loop circuit 130 develops a channel selection signal which is a measure of the difference between the tuned station of FM tuner 122 and the station requested from the data presented from bus 128 of microprocessor 12. Thus, it must be understood, although not depicted in FIG. 4, that phase-lock-loop circuit 130 has a feedback loop which is converted to FM tuner 122.

The station selection signal from circuit 130 is then coupled to a counter or prescaler 132 which generates a tuning signal appropriate for FM tuner 122 to drive it in the appropriate direction to minimize the frequency difference between the station to which FM tuner 122 is actually tuned and that which is being called for by the channel selection data bus 128.

System 10 is similar provided within AM radio tuner 134, which in the illustrated embodiment has a separate AM signal from an AM antenna. In the same manner, circuit 130 and prescaler 132 are used to develop an appropriate tuning signal which is coupled to AM radio tuner 134. Again, the output of AM tuner 134 is coupled to preamplifier 126 so that a usable audio signal for a conventional amplifier is provided.

The RF television signal from splitter 16 is directed both to a television tuner 136 and a VCR tuner 138, both included within system 10. An IF signal is generated at the output of VCR tuner 138 and television tuner 136. The IF signal is demodulated and amplified by a conventional IF strip 140 in a case of VCR tuner 138, and by IF strip 142 in the case of television tuner 136. The audio signal and video signal outputs from IF strips 140 and 142 are then each appropriately provided to an audio signal switch 144 and a video signal switch 146, diagrammatically depicted in FIG. 5. Audio signal switch 144 and video signal switch 146 are each coupled to address/data bus 128 of microprocessor 12 and are solid state switches manipulated by microprocessor 112.

Therefore, the VCR audio signal at input 148 of audio switch 142 or the TV audio signal at input 150 of switch 144 may be appropriately provided through switch 144 to an output terminal 152 which in turn is connected to the audio input of a first VCR, an audio output terminal 154 which is connected to the audio input of a second VCR, or to an audio output terminal 156 connected to the audio input of a monitor. These are unmodified, conventional VCRs or monitors which the user has in his home or office.

Alternatively, the selected audio signal can be provided at audio output terminal 158 which is provided to RF modulator 146 in FIG. 4. RF modulator 146 is also provided with the audio signal from strip 142. The output of RF modulator 146 is then coupled to the antenna terminals of the user's conventional and unmodified television set. Similarly, the video signal from TV tuner 136 is provided at input terminal 160 of video signal switch 146 as is the VCR video signal at terminal 162. Either of the video signals at terminals 160 or 162, or at other input terminals discussed below, can then be selectively coupled through solid state switch 146 to the video signal input connected to output terminal 164 of switch 146, to output terminal 166 which is coupled to the video input of the first VCR, or to output terminal 168 which is coupled to the video input of the second VCR. As in a case with audio signal switch 144, the video signal is fed back from switch 146 via terminal 170 to a video input of modulator 146 in FIG. 4 to selevtively provide a switched video signal to the user's television set.

As in a case FM channel tuner 122 and AM radio tuner 134, VCR channel tuner 138 is similarly controlled in response to channel selection data from bus 128 input to a phase-lock-loop circuit 137. A channel selection signal appropriate for VCR tuner 138 is then coupled to a prescaler circuit 139 whose output in turn appropriately drives VCR tuner 138 to the desired tuning point. An identical phase-lock-loop circuit 141 responds to channel selection bus 128 to similarly provide a channel selection to a prescaler 143 connected to television channel tuner 136.

If the user has a VCR or video disc player, it is also possible that audio signals may be provided not from a cable or broadcast feed but from these units as well. Therefore, audio switch 144 also includes an audio input terminal 170 coupled to the audio output of a first VCR, an audio input terminal 172 coupled to the audio output of the second VCR, and an audio input terminal 174 coupled to the audio output of the video disc player. The speech signal from amplifier 106 may be coupled to audio input terminal 176 to allow speech generated by the microprocessor 12 to be appropriate switched to any of the stereo amplifiers, monitors or television sets.

In the same way, video signal switch 146 is provided with a video signal input terminal 178 for the first VCR, video signal input terminal 180 for the second VCR and video signal input terminal 182 for a video disc player.

Figure 5:
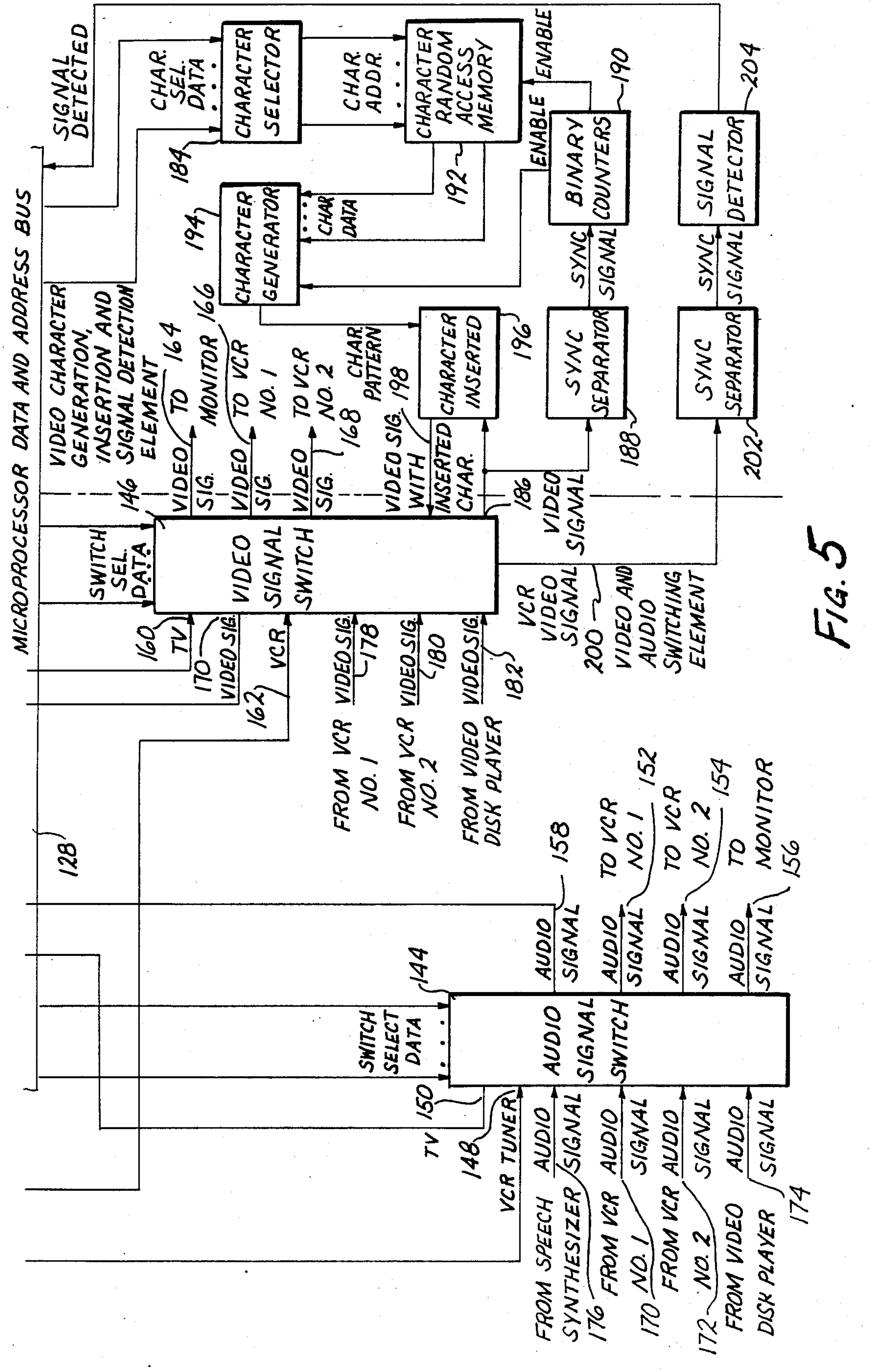
FIG. 5 is a diagrammatic depiction of the audio/video signal switches, the character generator and VCR signal detector elements as depicted in FIG. 1.

Another internal device within system 12 which is connected to audio and video switches 144 and 146 is character generator 38 depicted in FIG. 1. Character generator 38, as shown in greater detail in FIG. 5, is comprised of a character selector circuit 184 coupled to bus 128. Character selector 184 receives a character select data from microprocessor 12, typically in ASCII code. If a video signal is being coupled to video signals switch 146, it is output on terminal 186. A sync separator 188 receives a video signal as an input and separates the synchronization signal from the video signal. A predetermined number of synchronization pulses are counted by binary counter 190, which generates an enable signal which is coupled to a random access memory 192 and character generator 194. The addresses for character random access memory 192 are generated by microprocessor 12 via character selector 184. Appropriate character data is then read from character random access memory 192 into character generator 194. The necessary signal elements corresponding to the characters read from memory 192 are then appropriately generated by character generator 194 and communicated to a character inserter 196. The desired character pattern input into character inserter 196 from character generator 194 is overlaid into the video signal input into character inserter 196 at terminal 186. The video signal containing the inserted characters is then fed back into video signal switch 146 at input terminal 198.

What is now available within video signal switch 146 is a video signal which has inserted or overlaid therein appropriate alphanumeric characters as determined according to the data communicated from bus 128 through character selector 184, memory 192 and character generator 194.

The inserted characters are thus displayed for a predetermined interval, normally 10 seconds, on the selected television screen and/or monitor screen whenever power is turn on to either one or both of the screens or a channel is newly selected. Typically, the message display will include the channel number, the correct time, and an appropriate viewer identification request. Any message which is received by a microprocessor 12 for viewer audience information, polling, or response purposes may be generated and inserted into the available video signal for screen display. Furthermore, any message internally generated within the instruction set for microprocessor 12 or which may be initiated by user activation of remote control unit 56 could also be displayed. Similarly, whenever one of the video magnetic tape recorders/players (VCRs) or video disc player beings playing a prerecorded program on the television or monitor, microprocessor 12 will automatically output an identification request message to the character generator which then overlays the appropriate of alphanumeric message in the display screen.

If a VCR video signal is provided to video signal switch 146, it is also provided to output terminal 200. The VCR video signal is provided to a sync separator 202 which extracts the synchronization pulses. A signal detector 204 then provides an appropriate signal indicating that a VCR video signal is being detected during a recording by the first VCR or second VCR. The output of signal detector 204 is thus provided as a digital data signal to bus 128 for appropriate microprocessor control and monitoring. In this way it can be determined whether the viewer is watching a prerecorded video program from his VCR recording a video program from the TV or VCR tuners, another VCR or video disk player.

It can thus readily be appreciated that through appropriate software control of audio and video switches 144 and 146, as may be modified through remote control unit 56 together with VCR video signal detection through circuits 202 and 204, the viewing behavior of the user can be accurately monitored by microprocessor 12, and simultaneously or near simultaneously therewith automatically transmitted through communication interface 46 to a real-time monitoring computer or, if desired, stored within memory 88 for later sampling.

Therefore, it must be understood that the illustrated embodiment has been set forth only for the purposes of illustration example and should not be taken as limiting the invention which is defined in the following claims. For example, system 10 may include an switched AC power panel subject to the control of microprocessor 12 so that the television set, monitor and stereo amplifier may each have their AC power selectively provided according to program control. This allows for additional monitoring and system control.

Furthermore, an internal power supply for the circuitry illustrated in FIGS. 1-5 may be supplemented by an internal chargeable battery which powers up upon a line failure to allow continued operation of microprocessor 12, memory 88 and to perform failsafe communication through communication interface 46 to the central computer. In this manner, no information would be lost in the event that AC power fails or system 10 is accidentally disconnected by the user.

Furthermore, the illustrated embodiment has been described in an application directed to electronic media rating or monitoring. It is entirely within the scope of the present invention that system 10 may also be utilized for data entry storage and display, both in consumer and in commercial contexts. For example, a keyboard could be coupled through test connector 100 or substituted for remote control panel 56 to allow for at-home shopping, banking or remote ordering in industrial or commercial contexts in combination with television signals received by broadcast or cable.

The possibility of interactive viewer communication in the context of a simultaneously transmitted audiovisual program allows for expanded educational opportunities. Tutorial programs could, for example, be downloaded into memory 88 and allow the user to then proceed with an interactive tutorial in combination with a transmitted audiovisual presentation.

Furthermore, it should be noted that television and VCR monitors 138 and 136 can be arbitrarily tuned by microprocessor 12, thereby greatly expanding the range of television signals that may be received over that from the fixed number of cable channels or broadcast channels available. The ability to arbitrarily tune for television signals thus includes interactive communication in the context of amateur television.

The programability of the home entertainment system vested in microprocessor 12 also allows parental control of electronic media programming. A parent may preprogram in timed sequence the appropriate channels and times which will be displayed upon the monitor or television set through remote control unit 56. System 10 may be altered only through the use of unit 56 and therefore, by removing unit 56, only the preprogrammed channels and viewing times will be permitted through TV channel tuner 136 or any of the user's separate VCRs or video disc players through programmable control of audio and video switches 144 and 146.

Further, system 10 allows a hands-off operation with respect to the entire home entertainment unit. In other words, a combined interactive speech and visual control of home entertainment ensemble of devices becomes possible with the implementation of a very rudimentary word recognition algorithm within microprocessor 12.

What is most surprising is that the networking power of the system of the invention is possible at a very low cost with the cost of the system in quantity being approximately of few hundred dollars. Future manufacturing improvements in the industry can be expected only to reduce the cost even further. A detailed schematic and parts list is incorporated herein hereto and included as an appendix available for inspection within the Patent Office files pertaining to this application.

We claim:

1. An electronic system for monitoring and controlling bidirectional communication of conventional broadcast formatted audio and audio visual information without communicating any channel information between a remote source and users at a viewing/listening location comprising:

a microprocessor;

a digital memory coupled to said microprocessor;

channel selection means coupled to said microprocessor for communicating programming information to said microprocessor from users at said viewing/listening location;

a television tuner coupled to and tunable by said microprocessor;

a VCR tuner coupled to and simultaneously tunable by said microprocessor with said television tuner;

audio switching means coupled to and controlled by said microprocessor, said audio switching means further coupled to said television tuner and VCR tuner;

video switching means coupled to and controlled by said microprocessor, said video switching means also coupled to said television tuner and VCR tuner;

a character generation means coupled to and controlled by said microprocessor, said character generation means for generating an alphanumeric signal as provided from said microprocessor and combining said alphanumeric signal into a video signal for display;

a plurality of conventional and unmodified audio and video units for generating an audio and video display respectively, said plurality of units being selectively coupled through said audio switching means and video switching means subject to microprocessor control to said television tuner and VCR tuner, said television tuner and VCR tuner being activated and tuned in response to commands provided to said microprocessor through said channel selection means, interactive communication being provided between said microprocessor and said users at said listening/viewing location through said character generator means and at least one of said plurality of audio and video units as selectively switched through said audio switching means and video switching means as appropriate, communication interface means coupled to said microprocessor for communicating with said remote source via telephone lines, said microprocessor communicating at least near real time information with respect to utilization of said plurality of audio and video units at said viewing/listening location to said remote source through said communication interface means; and speech input means for receiving audible speech commands from said users at said viewing/listening location and generating a corresponding signature signal, said microprocessor means receiving said signature signal from said speech input means and analyzing said signature signal for comparison to a prerecorded corresponding signature signal, said microprocessor then generating a correlation factor between said signature signal received from said speech input means against said recorded signature signal to identify a source of said audible speech commands in said viewing/listening location, whereby said plurality of audio and video units at said viewing/listening location are networked without any requirement of unique design in said units or modification of said units.

2. The system of claim 1 wherein said prerecorded signature denotes a viewer's/listener's identity.

3. The system of claim 1 further comprising motion detection means coupled to said microprocessor, said motion detection means for detecting direction of movement within said viewing/listening location across a predetermined boundary line so that ingress and egress by said users from said viewing/listening location can be determined during operation of said plurality of audio and video units.

4. The system of claim 3 further comprising a speech output means coupled to said microprocessor, said speech output means for generating an audible speech signal corresponding to programmed information within said microprocessor.

5. The system of claim 4 further comprising a radio tuner coupled to and tunable by said microprocessor, said radio tuner generating an audio signal, said audio signal being coupled through said audio switching means to at least one of said plurality of audio units for audible reproduction within said viewing/listening location.

6. The system of claim 1 further comprising a VCR signal detector means coupled to said video switching means and said microprocessor, said VCR signal detector means for detecting a VCR video signal from said VCR tuner and said plurality of video units to generate a digital signal coupled to said microprocessor indicative of a video signal within said system other than in said television tuner.

* * * * *